United States Patent [19]
Panigati

[11] 4,261,547
[45] Apr. 14, 1981

[54] ARRANGEMENT FOR CONTROLLING A FLUID UNDER PRESSURE BY MEANS OF A SEAL

[75] Inventor: Pier L. Panigati, Lugano, Switzerland

[73] Assignee: Establissement d'Occident, Liechtenstein

[21] Appl. No.: 972,512

[22] Filed: Dec. 22, 1978

[30] Foreign Application Priority Data

Dec. 28, 1977 [CH] Switzerland ............ 16024/77

[51] Int. Cl.³ .............................................. F16K 3/28
[52] U.S. Cl. .............................. 251/175; 251/DIG. 1; 251/333
[58] Field of Search ................... 251/DIG. 1, 333, 175

[56] References Cited
U.S. PATENT DOCUMENTS

| 3,079,125 | 2/1963 | Tischler et al. | 251/333 |
| 3,468,511 | 9/1969 | Haskins | 251/333 X |
| 3,525,364 | 8/1970 | Esche | 251/333 X |
| 3,654,950 | 4/1972 | Hamm | 251/333 X |

Primary Examiner—Arnold Rosenthal
Attorney, Agent, or Firm—Roylance, Abrams, Berdo & Farley

[57] ABSTRACT

A hydraulic valve is disclosed which has a gasket sealing against and, to a limited extent axially movable on, a movable valve member. The valve member has a radial shoulder sealing surface which is spaced from a matching, larger diameter concentric radial shoulder sealing surface of the body of the valve. The sealing surfaces can be aligned with each other by an axial movement of the valve element, with a radial spacing between them providing a fluid passageway. The gasket has an angular cross-section, with the apex being toward where the sealing surface of the valve element adjoins the valve element surface over which the gasket extends outward from the axis of the valve element. The angular relationship between the aligned sealing surfaces and the sealing portion of the gasket is such that when the gasket is moved toward the sealing surface of the body by the valve element, the outer lip of the gasket sealing portion first contacts the surface, thus significantly blocking fluid flow. This causes the gasket sealing portion to be pushed by the fluid pressure itself so that the gasket rotates about its cross-sectional torsional axis to press the sealing portion flat against the aligned sealing surfaces and over the fluid passageway to block its flow. Various relative configurations of the gasket and sealing surfaces are disclosed. Also disclosed are combinations of such arrangements for forming multiple-function valves.

6 Claims, 10 Drawing Figures

4,261,547

ARRANGEMENT FOR CONTROLLING A FLUID UNDER PRESSURE BY MEANS OF A SEAL

BACKGROUND OF THE INVENTION

The present invention relates to fluid control valves of the type having a body, a valve member which is movable inside a chamber in the housing, and a gasket for sealing between the body and the valve member.

Valves of this type can be used whenever it is desired to block the flow of a fluid under pressure; to cause it to flow through an outlet port; or to have the fluid itself be led in a particular direction for use in a plurality of arrangements in series. This latter situation is the case for all devices used for controlling the energy of the fluid, such as for example shut-off valves, three-way, four-way, or five-way valves. Such devices are generally constructed with the use of spool systems (consequently with sliding gasket) or with the use of closure elements of various sorts. In all these last-named devices, the closing operation is brought about by means of a force acting on the gasket. This creates initially the conditions suited for sealing which require a certain compression between the valve element and the gasket and thereafter the maintaining of the seal and blocking of the hydraulic fluid. This force is therefore equal to the sum of a force which along the sealing surface has a greater pressure as does the pressure of the fluid to be held back and a force which is proportional to the pressure and to the surface upon which it acts.

The contact pressure leads to a rapid wearing of the gasket and also of the valve element. To this is added a recess which often leads to sealing difficulties, since the action of the sealing edge or seat of the body on the gasket can become eccentric with respect to such a recess already there, with the resulting conditions for a complete sealing being rather precarious.

It is therefore an object of the invention to avoid these problems of the wear of the seat and the recess and to provide a control apparatus in which the necessary force for the closing and the blocking of the fluid is minimized, so that such arrangements can also be utilized in the miniaturization of pressurized fluid systems, especially logic systems.

SUMMARY OF THE INVENTION

The novel apparatus in accordance with the present invention is characterized in that a gasket portion which is cylindrical and is concentric with the longitudinal axis of the valve member has also a second portion at an angle to the first portion. The body and the valve element have surfaces which can be aligned together by means of an axial movement of the valve element, by which the outer surface of the second portion lies with one edge against the one of the named surfaces by the action of the hydraulic fluid as a result of the axial movement of the gasket. After contacting this surface, the gasket pivots about its torsional axis until the cylindrical portion is in contact with the body or with the valve element, in order to thereby stop the flow of the fluid through the chamber.

DETAILED DESCRIPTION

Figure 1:
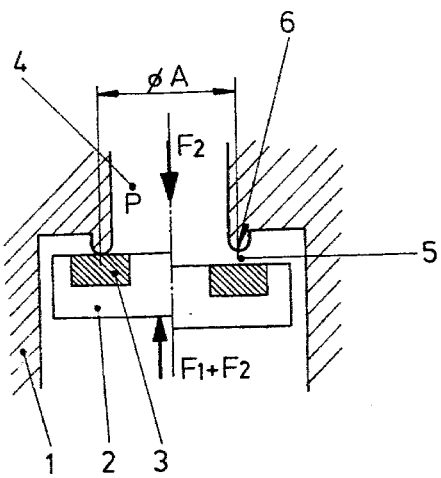
FIG. 1 is a sectional, schematic view of a control apparatus in accordance with the prior art.

In the FIG. 1 there is shown a sealing arrangement of a known type in which the left part represents the closed position while the right part represents the open position. The numeral 1 designates the body in which the condition of the pressurized fluid is to be controlled. The numeral 2 designates a valve element which has a resilient gasket 3 on its upper side. When the valve element 2 is pressed against the body 1 by means not shown, the fluid is trapped in a chamber 4. As soon as the valve element retracts itself, there is formed a ring-shaped passageway 5 between the valve element 2 and a seat which is in the form of a rim 6 on the lower side of the chamber 4 and has a given relationship to the dimensions of the opening. The fluid passing through the passageway 5 strikes against the valve element 2. If one arranges one or more such parts in addition thereto, then one has a complete directional control over the fluid, which one can restrict or lead in the desired direction.

In the following there will be discussed in more detail the particulars of the presented example. It is assumed that the fluid has a pressure p. To close the annular passageway 5, a force F must act on the valve element 2 in order to move it again from its open position against the rim 6. This force provides the necessary sealing conditions for the gasket 3 over a face with a diameter A and also overcomes the force $F_2$, which acts in the opposite direction and arises from the pressure p of the fluid. This has the tendency to remove the valve element 2 from the rim 6. This force $F_2$ is proportional to $(\pi \cdot A^2/4)$ times the surfae determined by the diameter A, and therefore has the value $(\pi \cdot A^2 \cdot p/4)$. In practice, one can think of the force F in terms of the two components $F_1$ and $F_2$, of which $F_2$ has the value just given, while $F_1$, which is the force necessary for maintaining the seal, generally depends upon the resiliency of the contacting parts but nevertheless is always a direct function of the dimensions of the contact surface of diameter A as well as of the pressure p.

The force $F_1$ must at all points of the ring-shaped contact surface of diameter A exert a force which is greater than p. This is the necessary condition for trapping the fluid with pressure p in the chamber 4.

This ring-shaped sealing surface can, of course, have very different dimensions, which are dependent upon the diameter A. For manufacturing reasons, however, the rim 6, which defines this surface, cannot have any dimensions less than a reasonable minimum. It follows that with a reduction of A, the ring-shaped surface is not reduced proportionately. As a result, in the miniaturization and in the reducing of $F_2$, despite efforts to keep the forces as small as possible, $F_1$ has an ever larger value relative to $F_2$. It further arises that although because of the force $F_1$, the rims 6 become ever more critical and costly, at the same time these rims become sharper and push ever deeper into the sealing member 3. This leads to their wearing more rapidly even though they are sufficiently resilient for the sealing action. Therefore, in practice one must always find the optimum conditions between the maintaining of the force $F_1$ and the commercially most feasible manufacture of the rim 6, which must have the form best suited for preventing the damage from its pushing into the sealing member 3. This pushing in with its damaging effects, is in addition to an existing deformation recess which itself can already lead to sealing difficulties: Namely, if due to wear, excessive play, or the like the rim 6 finds itself in a region other than the deformation recess, but adjacent to it, then extremely difficult conditions arise when the rim 6 of diameter lies excentrically on a deformation recess of the same diameter.

It is clear to any specialist that at the two points at which the rim crosses a deformation recess the seal will be very minimal or non-existent.

The necessity of overcoming the problems arising from the wearing of the contacting parts, the constructing of the rim 6, and the increasing influence of the force $F_1$ with decreasing diameter A have led to other sealing arrangements which nevertheless only partially solve the problems.

Figure 2:
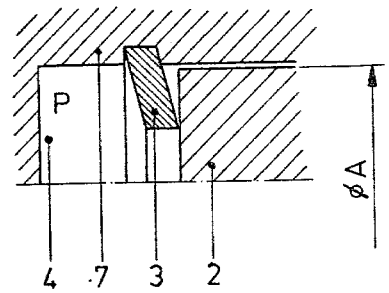
FIG. 2 is a sectional, schematic view of another control apparatus in accordance with the prior art.

As an example for this, there is shown in FIG. 2 another sealing arrangement of a generally known type. With it the problems in connection with the wearing of the rim and with the deformation recess are solved; however, there is still present the force $F_1$, which in this case arises from the resilient deforming of the sealing member 3. The deforming is necessary for the sealing in order to maintain at all contact points between the parts 2 and 3 a pressure which is greater than the pressure p in the chamber 4.

It was already mentioned that with the present invention all these disadvantages can be overcome in order to provide a control apparatus for a hydraulic fluid which has no critical conditions for the manufacturing, no expensive material requirements, which guarantees a reliable operation, which responds rapidly, and which has a service life which, especially for the sealing member, is almost unlimited.

Several constructions in accordance with the invention are shown in the figures of the drawings. The mode of operation is the same for all of them and will be described below. These constructions can be suitably used when a simple sealing is desired (in the case of a two-way valve), with the two conditions of flow-through and blocking of the hydraulic fluid. There are also shown constructions (FIG. 5) which can be used coupled together in order to with one single movement open one path and simultaneously block another (in the case of three-way or five-way valves, when one or more arrangements according to FIG. 3 are combined with one or more according to FIG. 4).

Figure 3:
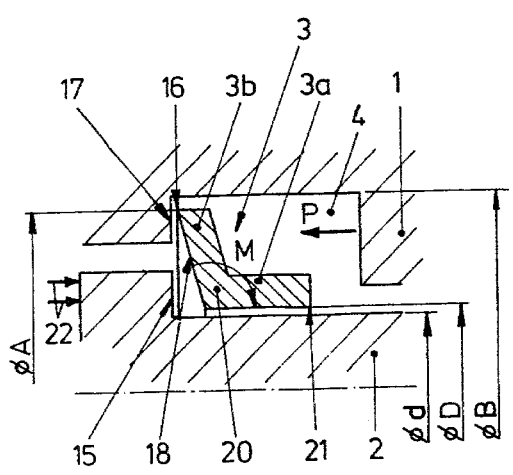
FIG. 3 is a sectional, schematic view of a control apparatus in accordance with a preferred embodiment of the present invention and having a single gasket.
Figure 4:
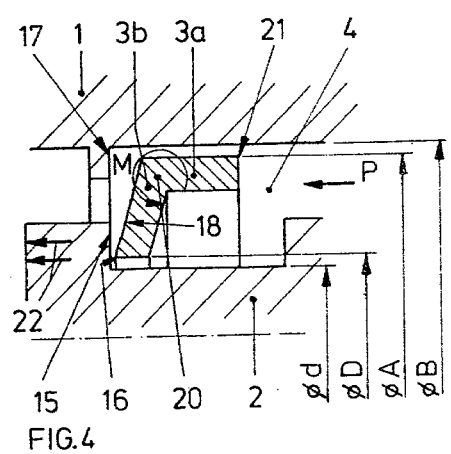
FIG. 4 is a sectional, schematic view of a control apparatus in accordance with another preferred embodiment of the present invention and also having a single gasket member.
Figure 9:
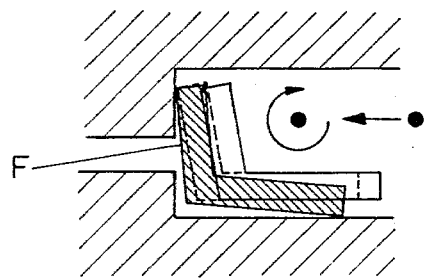
FIG. 9 is a sectional view similar to FIG. 3 showing the gasket member in the sealed position.

In the FIGS. 3 and 4, as in the previous Figures, there is a housing, designated by 1, in which the hydraulic fluid must be held back, while 2 designates the valve element and 3 the gasket. The ring-shaped gasket 3 in accordance with the Figures has a portion 3a, which is cylindrical and therewith concentric to the longitudinal axis of the apparatus, as well as a portion 3b, which for this construction is conical and therewith is slanted toward the named axis. These two parts are joined with each other at an angle which is greater than 90 degrees. The cylindrical portion 3a acts in the FIG. 3 on the inner wall of the chamber 4, that is, on the valve member 2, while in the FIG. 4 construction it acts on the outer body wall. When the valve member 2 finds itself in a position in which its radial surface 15 is in the same plane as the radial surface 17 of the body 1, then the ring-shaped gasket 3 must satisfy the following conditions: Its diameter D must be preferably somewhat greater, or at least equal, to the diameter d of the valve member, while its outer diameter A at its maximum must be equal, or preferably even somewhat less than, the inner diameter B of the chamber 4 of the body, so that the gasket 3 can move freely within limits, on the valve element under the action of pressure. The gasket 3 additionally has on the outer side of its conical portion a surface 18, which in the rest position of the gasket makes an angle with the radial surface 17 of the body (FIG. 3) or with a raised projection on it (FIG. 4). When the gasket is pushed by the action of the pressure p, in the direction of the single arrows drawn in the Figures, then it moves until the edge 16 of the conical portion 3b contacts the surface 17 of the body (in FIG. 3), or the radial surface 15 of the valve element 2 (in FIG. 4), depending upon the particular type of gasket 3. At this point, the gasket comes under the influence of outside forces and inner reactions which in their combined action, as illustrated in FIG. 9, create a torque M about the torsional axis 20 of the cross-section of the gasket. This torque M leads to a rotation of the cross-section of the gasket about this axis, which leads to first a resilient deforming of the gasket until an edge 21 of the cylindrical portion 3a contacts the cylindrical surface of the valve element (FIG. 3) the outer side of the space 4 (FIG. 4). From this moment on, the seal is created and the gasket continues its movement with a second resilient deforming which brings the entire surface 18 in contact with the vertically aligned surfaces 17 and 15. The gasket is therewith brought into this sealing position by direct loading from the pressure p, without some force $F_1$ (see above) having to be applied by the valve element to deform the gasket or to supply over the contact surface the necessary pressure for sealing. This direct loading is thereafter applied by the pressure p of the trapped fluid itself. Under these conditions, in order for the seal to be maintained, there must act on the valve element 2 a force $F_2$ which is equal to about $$\frac{p \cdot \pi}{4} (A^2 - d^2).$$

Obviously, for the rotation about the ring-shaped axis 20 and for the resilient deformation, the resilient resistance and the inner torsional resistance of the gasket, or rather the properties of the materials of which it is made, must be overcome. Since this is provided entirely by the pressure p, it follows that the apparatus of the described type draws the gasket tight from a given distance by means of a pressure greater than 0. Since one can, nevertheless, make the gasket with sufficient degrees of freedom, also in the choice of materials, one can with absolute certainty guarantee that the minimal functional pressure is limited to a few tenths atmospheres of pressure, which then permits the use of such apparatus in the largest number of industrial applications.

If the valve element now moves in the direction of the double arrow 22 in order to remove the gasket 3 from the surface 17 again (FIG. 3), or in order to remove the valve element from the gasket, as in FIG. 4, then after the resulting separation the hydraulic fluid can escape past the valve element and the gasket.

If the valve element is again moved up to the alignment of the surfaces 17 and 15, then the conditions for the sealing are again created very promptly, and with regard to the most sensitive element of the entire apparatus, namely the gasket 3, with great delicacy.

A comparison of the apparatus of FIGS. 3 and 4 with that of FIGS. 1 and 2 permits immediate recognition of the advantages of the first-named apparatus.

Every sealing rim is avoided, and therewith also every costly and critical labor. There is absent as well every permanent deformation of the resilient member, by which the service life is extended practically indefinitely. Gone also is the force $F_1$, so that the use of the apparatus is simplified and more readily applicable even for extreme miniaturization.

Figure 5A:
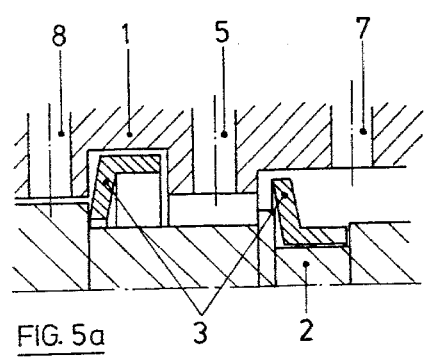
FIG. 5a is a sectional, schematic view of a control apparatus in accordance with a third preferred embodiment of the present invention and having two gaskets, a valve element being shown in one position.
Figure 5B:
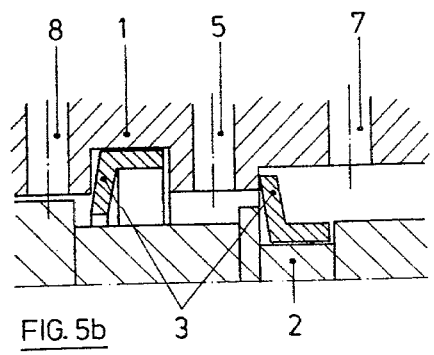
FIG. 5b is a sectional, schematic view of the apparatus of FIG. 5a with the valve element shown in another position.

Out of the separate or combined use of the two apparatuses according to FIGS. 3 and 4 there arise very many application possibilities. The FIG. 5 shows one example of this, in which both apparatuses are used combined. In this case, the movement of the valve element functions at the same time for sealing on the left side as well as for permitting passage on the right side, and the reverse. By the presence of an entrance passageway 5, there arises that in this case this passage is connected alternately with the line 7 or the line 8. It follows that when the line 7 forms the entrance, the passage 5 the output, and the line 8 the exit, then there is realized a three-way valve.

Figure 6:
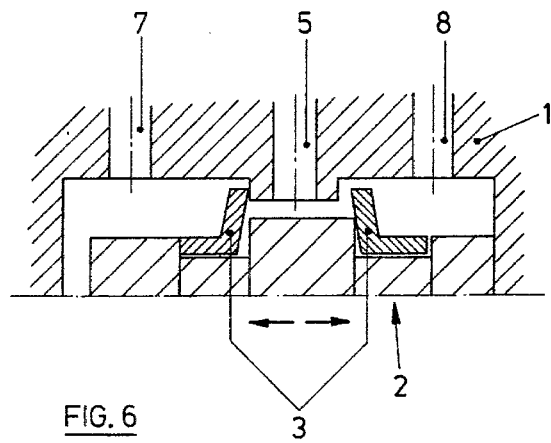
FIG. 6 is a sectional, schematic view of a control apparatus in accordance with a fourth embodiment of the present invention and having two gasket members.

In the FIG. 6 there are correspondingly combined two apparatuses of the type according to FIG. 3, with the passages 5, 7 and 8. If one feeds the schematisized apparatus through the entrance 7 or 8, or simultaneously through both, then one has at the passage 5 an exit according to the logic function AND.

Figure 7:
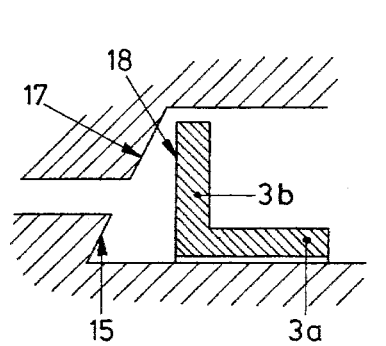
FIG. 7 is a sectional, schematic view of a control apparatus which is a variation of the apparatus of FIGS. 3 and 4.
Figure 8:
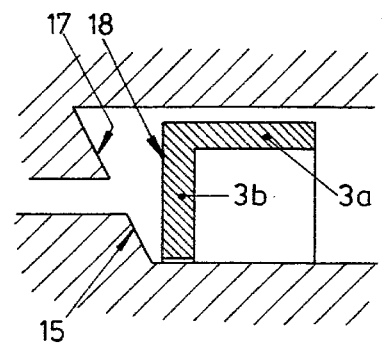
FIG. 8 is a sectional, schematic view of a control apparatus which is another variation of the apparatus of FIGS. 3 and 4.

The portion 3b of the gasket need not necessarily be slanted toward the portion 3a. As can be seen from FIGS. 7 and 8, the surface 18 can also be at an angle of 90 degrees with it. It is necessary only that this surface at the moment of contact forms an angle with the aligned surfaces 15, 17, which in this construction are arranged at a slant. It is also possible that these surfaces, as well as the outer surface 18, are together slanted with respect to the longitudinal axis of the apparatus, by which the mentioned angle is maintained between them.

I claim:
1. Apparatus for controlling a fluid medium under pressure by means of a seal, the apparatus being of the type having a body containing a hollow chamber in which there is an axially movable valve element and at least one gasket, an outer wall of said chamber being defined by said body and an inner wall of said chamber being defined by said valve element, said chamber having an entrance and an exit for the fluid, said gasket being movable relative to both said valve element and said body, the improvement wherein
   said gasket has a first, cylindrical portion which is generally concentric with the longitudinal axis of said valve element and a second portion at an angle to said first portion, and has a torsional axis,
   said body and said valve element each having a sealing surface, which surfaces may be brought into alignment with each other, and
   said gasket normally being spaced from said body and valve element, an outer surface of said second portion of said gasket being movable to contact with an edge against one of said surfaces as a result of axial movement of said gasket in response to the action of said fluid,
   whereby upon said contact with said surface, said gasket rotates about its own torsional axis until said cylindrical portion is in contact with the other of said surfaces of said body and said valve element in order to thereby stop the flow of said fluid through said chamber.
2. The apparatus of claim 1, wherein said outer surface of said second portion is at an angle to the sealing surfaces of said body and said valve element when said surfaces are aligned.
3. The apparatus of claim 2, wherein the aligned said sealing surfaces are at a right angle to the longitudinal axis of said apparatus.
4. The apparatus of claims 1, 2, or 3, wherein said cylindrical portion approaches said outer wall of said chamber and contacts it after said rotation.
5. The apparatus of claims 1, 2, or 3, wherein said cylindrical portion approaches said valve element and contacts it after said rotation.
6. The apparatus of claim 1, comprising:
   two gaskets, and
   at least three fluid lines, one of which forms an entrance for said fluid and the others of which form fluid exits,
   said body and said valve element forming a pair of radial sealing surfaces to one side of said entrance and a pair of radial sealing surfaces to the other side of said entrance,
   whereby said sealing surfaces of said one or said other pair may be aligned with each other by an axial movement of said valve element in order to permit one of said gaskets when approaching said sealing surfaces to block a flow from said entrance to the corresponding one of said exits, while the other of said gaskets remains in its open position.

* * * * *